May 7, 1940. G. A. LYON 2,199,888
WHEEL DISK AND WHEEL ASSEMBLY
Filed Oct. 5, 1938 3 Sheets-Sheet 1
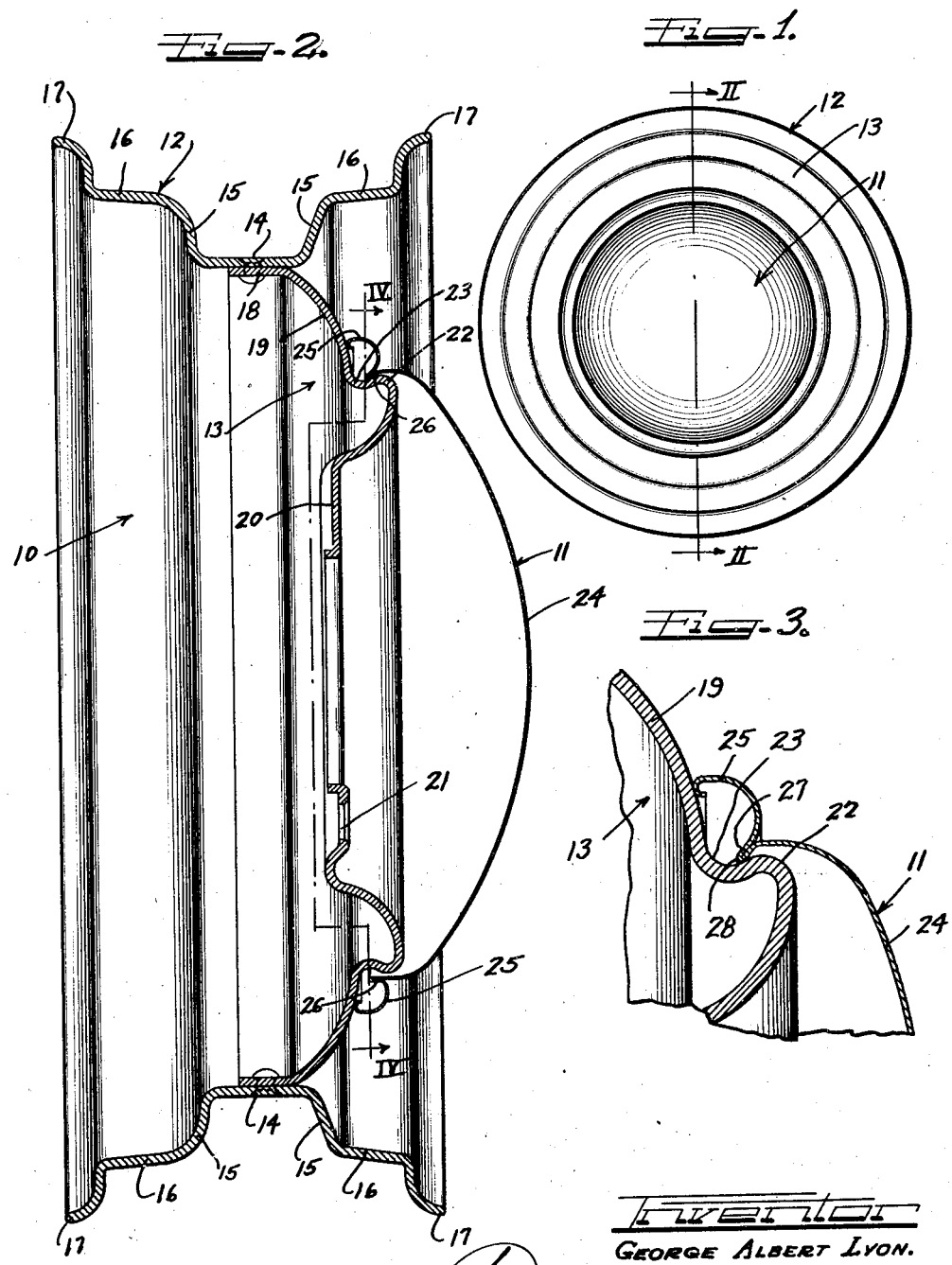
Inventor
GEORGE ALBERT LYON.

Inventor
George Albert Lyon.

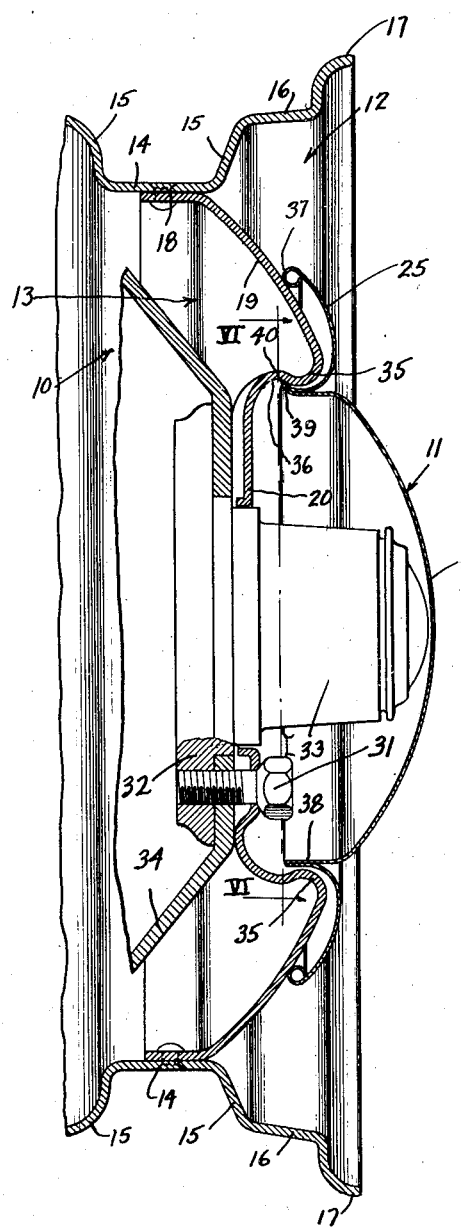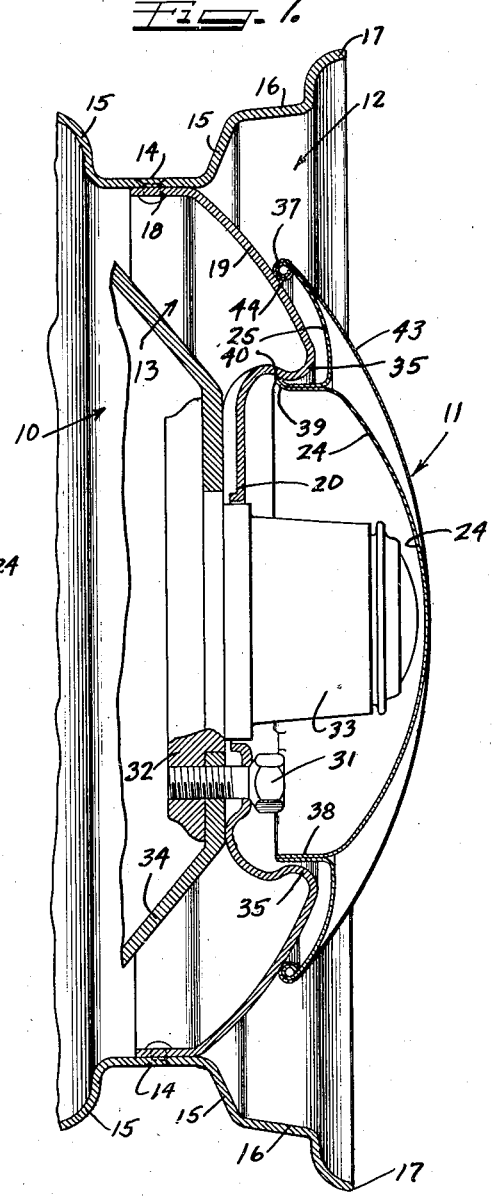

Patented May 7, 1940

2,199,888

UNITED STATES PATENT OFFICE 2,199,888

WHEEL DISK AND WHEEL ASSEMBLY

George Albert Lyon, Allenhurst, N. J.

Application October 5, 1938, Serial No. 233,354

6 Claims. (Cl. 301—37)

This invention relates to a wheel assembly, and more particularly to a wheel assembly in which the wheel disk makes a snap-on engagement with the vehicle wheel without the aid of any spring fingers or other usual form of attaching means.

The majority of vehicle wheels today are equipped with ornamental wheel disks over their outer surfaces. The use of these wheel disks permits a more economical manufacture of vehicle wheels, since the wheels themselves may be designed solely for strength and utility without regard to ornamental appearance, the wheel disk being employed for the latter purpose. The most popular form of wheel disk at the present time is a wheel disk having a highly polished exterior surface. The exterior surface of the disk may of course be finished in any other suitable manner, such as by enameling it or the like.

In order to minimize the total cost of the wheel assembly, it is, of course, necessary to minimize the cost of the wheel disk itself as much as possible. The thinner the sheet metal stock is, which is employed to make a wheel disk, the greater the saving is in the manufacturing cost. It has been found that a wheel disk may be constructed of a sheet of metal stock having a thickness dimension of such a character that if a single thickness of the metal stock is engaged by any fastening means, the metal of the disk is deformed at that point, but which when presented as a double thickness of metal formed by a fold, the metal in the disk thereof is not deformed.

A further item in the wheel assembly which contributes substantially to the manufacturing cost of the wheel assembly in the type of wheel assembly that is commonly known at the present time is the spring finger or attaching element which is employed to detachably secure the wheel disk over the front face of the wheel. It will of course be appreciated that the wheel disk must be detachable from the wheel in order to permit access to the wheel-mounting bolts which secure the wheel itself to the axle mounting element. The present invention provides a novel form of wheel disk which cooperates with a novel vehicle wheel in a novel manner which eliminates the use of any spring mounting fingers or other usual form of mounting means. More particularly, the wheel disk and vehicle wheel are so designed that portions of the wheel disk itself act as attaching means by virtue of the fact that other portions of the wheel disk are capable of being distorted out of their normal shape.

Accordingly, it is an object of the present invention to provide a wheel disk and wheel assembly having the above highly desirable characteristics.

Another object of this invention is to provide a novel wheel disk and wheel assembly in which the wheel disk is detachably secured to the wheel without the aid of any spring fingers or other usual form of mounting means extending between the wheel disk and the vehicle wheel.

A further object of this invention is to provide a novel wheel disk having an integral folded flange thereon, portions of which are depressed to form wheel engaging and securing portions.

A still further object of this invention is to provide a novel combination of wheel disk and vehicle wheel.

Another and still further object of the present invention is to provide a novel wheel disk having an integral tightly folded flange thereon which is arranged to be distorted out of its normally circular position to tightly engage a portion of a vehicle wheel upon which the wheel disk is mounted.

The novel features which I believe to be characteristic of my invention are set forth with particularity in the appended claims. My invention itself, however, both as to ts organization and manner of construction, together with further objects and advantages thereof, may best be understood by reference to the following description taken in connection with the accompanying drawings, in which:

Figure 1 is a front elevational view of a vehicle wheel having an ornamental wheel disk mounted thereon;

Figure 2 is an enlarged cross-sectional elevational view of the wheel assembly shown in Figure 1 as taken along the line II—II thereof;

Figure 3 is an enlarged fragmentary sectional view of that portion of the wheel assembly wherein the wheel disk makes a securing engagement with the vehicle wheel;

Figure 5 is an enlarged cross-sectional elevational view of a different embodiment of the present invention;

Figure 7 is a view similar to Figure 5 illustrating a further embodiment of the present invention.

Figure 4:
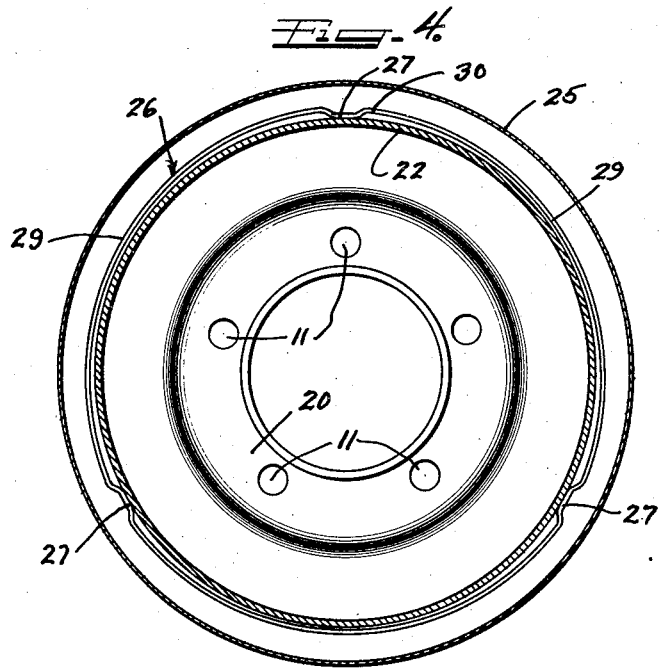
Figure 4 is a rear view, partly in cross section, of the wheel assembly taken along the line IV—IV of Figure 2.

Referring to the first embodiment of my invention which is illustrated in Figures 1 to 4 of the drawings, there is shown therein a wheel assembly comprising a vehicle wheel 10 and a wheel disk or ornamental cover member 11. As shown in the drawings, the wheel 10 comprises a rim part 12 and a body part 13. The rim 12 is of the usual drop-center type, including a base flange 14, opposite intermediate side flanges 15, opposite intermediate base flanges 16, and opposite edge portions 17. The drop center rim 12 as illustrated is of the type which is commonly employed in the automotive vehicle art of the present day, and as is well known to those skilled in the art, is arranged to seat and accommodate a pneumatic tire (not shown).

The body part 13 of the vehicle wheel 10 includes in general a rearwardly extending outer flange 18, a principal body portion 19 and a wheel mounting flange 20. The rearwardly extending outer flange 18 is welded or otherwise suitably secured to the underside of the base flange 14 of the rim 12. The mounting flange 20 is provided with an annular series of apertures 21, through which the usual wheel mounting bolts are adapted to extend to detachably mount the wheel 10 on the brake drum or other wheel axle part (not shown) in the usual manner.

The principal body portion 19 of the wheel 10 is provided with an annular shoulder 22, there being an annular groove or indented portion 23 behind the outer extremity of the shoulder 22. As will presently appear, the shoulder 22 provides a portion on the wheel 10 upon which the wheel disk 11 is seated and detachably secured thereto.

The wheel disk 11 includes a relatively large dome-shaped central portion 24, a concentric annular marginal portion 25 which is connected to the dome-shaped central portion 24 by an integral tightly folded flange 26. The flange 26 with the exception of several depressed portions presently to be referred to, extends directly axially rearwardly, as may be seen by an inspection of the cross-section of the flange 26 in the lower part of Figure 2 and as will be further understood upon a careful inspection of Figure 4. It will further be perceived from an inspection of the cross-section of the flange 26 in the lower portion of Figure 2 that the positioning of this flange on the wheel disk 11 is such that the flange clears the shoulder 22 of the wheel 10 and is slightly spaced therefrom radially outwardly.

In order to provide a tight gripping engagement of the wheel disk 11 on the wheel 10 without the use of the usual spring fingers which have previously been employed to extend between the wheel and the fastening flange of the wheel disk, the flange 26 is depressed at a plurality of points therearound and preferably at regular intervals, as is indicated at 27. As will be seen from an inspection of Figures 3 and 4, these depressed portions 27 are formed by simply pressing down a portion of the flange 26. For a reason which will presently appear, these depressed portions are not formed by slotting the metal and then pressing down a tongue, but the depressed portions 27 on the other hand are entirely and completely integral with the remaining portion of the flange 26. The edge portion 28 of the depressed portion 27 is pressed down to such an extent that the normal clearance dimension is slightly less than the maximum diameter of the cylinder 22. It will thus be understood that as the wheel disk is placed over the outer or front face of the wheel 10 and the flange 26 is forced over the shoulder 22, the depressed portions 27 cause a change in the curvature of the portion of the flange 26 which lies between adjacent depressed portions 27 (see Figure 4). That is to say, the flange 26, from its normally circular position is distorted in such a manner that certain portions of the flange 26 are radially outside of the original normal circular position, while other portions of the flange 26 are drawn inside of the original normal circular position. For example, it will be observed that the portion of the flange which lies substantially half way between adjacent depressed portions 27, as is indicated by the reference character 29, has been drawn inside of the original normally circular position of the flange 26; and that the portion of the flange 26 which lies substantially adjacent the depressed portions 27, as is indicated by the reference character 30, has been forced radially outwardly of the normally circular position of the flange 26. This contraction of the flange portions between depressed portions 27 causes the depressed portions 27 to be pulled tightly against the rear face of the shoulder 22 within the groove or recess portion 23 of the wheel 10. The result is that an extremely tight engagement is made between the wheel disk 11 and the wheel 10 which requires neither separate resilient mounting fingers nor other similar separate means. It will further be observed that the wheel disk may be very quickly and rapidly mounted on the vehicle wheel by simply snapping the integral folded flange 26 of the wheel disk 11 over the shoulder 22 of the wheel. It will further be understood that the wheel disk 11 may be readily snapped off of the wheel 10 when access to the wheel mounting flange 20 is desired, such as to remove the mounting bolts (not shown) which secure the wheel 10 to the brake drum or other wheel axle part of the conventional wheel and axle assembly.

To those skilled in the art it will at once be understood that my novel wheel disk and novel combination of vehicle wheel and wheel disk provides a wheel assembly which is extremely economical to manufacture, which is easily and quickly assembled, and which is rugged and reliable in use.

Figure 6:
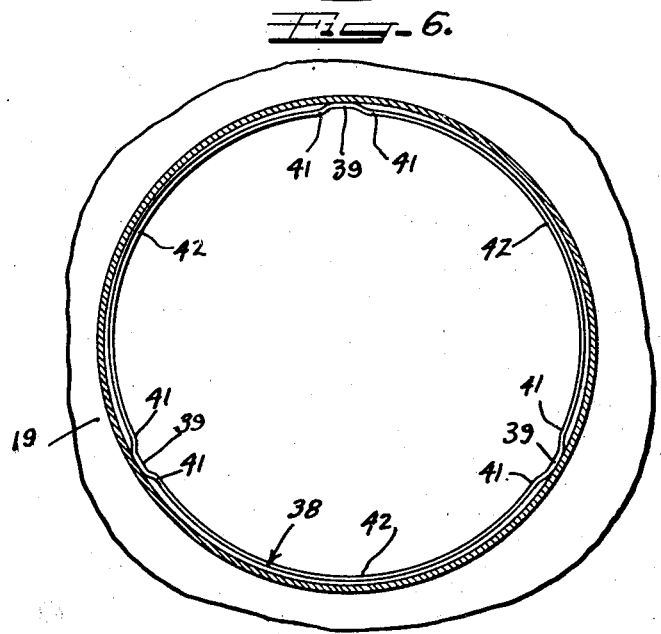
Figure 6 is a rear view partly in cross section of the embodiment of the invention illustrated in Figure 5 and as taken along the line VI—VI thereof.

In Figures 5 and 6 of the drawings I have illustrated a different embodiment of the present invention. More specifically, the embodiment of the invention illustrated in Figures 5 and 6 shows a wheel disk and a wheel assembly in which the shoulder on the wheel extends generally radially inwardly instead of radially outwardly, as is shown in the preferred embodiment of the invention and in which the flange on the wheel disk passes radially inwardly of the shoulder as it is moved axially rearwardly onto the wheel.

The wheel 10 as shown includes the usual drop-center rim 12 having a base flange 14, intermediate side flanges 15, intermediate base flanges 16 and outer edge portions 17. As seen in Figure 2, the rim 12 is secured to the body part 13 of the wheel and preferably is welded or otherwise suitably secured to a rearwardly extending outer flange 18 on the body part 13 of the wheel. The body part 13 also includes a principal body portion 19 and a wheel mounting flange 20, the latter being provided with an annular series of apertures 21 for the reception of wheel mounting bolts 31, which extend therethrough into engagement with the radial attaching flange 32 of the hub 33. The mounting bolts 31 may, of course, extend through the brake drum 34 if the latter is also mounted on the wheel fastening flange 32 of the hub 33.

The principal body portion 19 of the wheel 10 is provided with a generally radially inwardly extending shoulder 35 and with an annular groove 36 behind the shoulder 35. As will readily be appreciated from a careful inspection of Figure 5, the shoulder 35 and the recess or groove portion 36 are formed by providing an S-shaped annular fold or reverse curve in the body part 13 of the wheel 10.

The wheel disk 11 as shown in the embodiment of the invention illustrated in Figures 5 and 6 of the drawings, includes a dome-shaped central portion 24 and an outer annular marginal portion 25. The outer marginal portion 25 may be provided if desired with a curled outer edge, as at 37 which is adapted to rest on the outer face of the wheel 10.

The outer annular portion 25 and the central dome-shaped portion 24 are connected by an integral tightly folded rearwardly extending flange 38 which extends throughout substantially its entire circumferential dimension directly axially rearwardly, as is shown by the cross-section of the flange 38 in the lower part of Figure 5. It will further be observed that the flange 38 is disposed so as to extend past the shoulder 35 radially inwardly and axially rearwardly thereof, the flange 38 being spaced radially inwardly of the shoulder 35 in the same manner and for the same reasons that the flange 26 of Figure 2 was spaced radially outwardly of the shoulder 22. As is clearly shown in Figure 6 and in the upper part of Figure 5, the flange 38 is provided with a plurality of spaced, depressed portions 39. The depressed portions 39 are integral with the main part of the flange 38 and are depressed or bent radially outwardly to such an extent that their edges 40 are disposed radially outwardly from the center line of the disk a greater distance than the inside or current diameter of the shoulder 35.

The wheel disk of Figure 5 operates in substantially a similar manner to the wheel disk of Figure 2 in effecting a mounting engagement with the vehicle wheel. As will readily be appreciated from a careful inspection of Figures 5 and 6, the depressed portions 39, as they pass over the shoulder 35 of the wheel 10, cause a distortion of the flange 38 from its normally circular position. More particularly, the portions 41 of the flange 38 which lie adjacent the depressed portions 39, are forced radially inwardly from their normal position, while the portions 42 of the flange 38 are forced radially outwardly from their normally circular position. This distortion of the flange 38 from its normally circular position, causes the depressed portions 39 to be forced into tight engagement with the rear face of the shoulder 35 and into the grooved portion 36 of the wheel 10. The result is that an extremely efficient and reliable snap-on engagement is provided for the wheel disk without the use or need for the usual form of resilient fingers which are common in the art at the present time. It will readily be observed that the wheel disk 11 of Figure 5 may be snapped onto the wheel 10 by simply pressing the disk 11 axially rearwardly of the wheel and it may be snapped free of the wheel 10 by prying it off with a screw-driver, a tire tool, or any other suitable means.

In Figure 7 of the drawings I have illustrated a modified form of the embodiment of the invention illustrated in Figures 5 and 6. More particularly, I have shown a wheel disk 11 which includes a central dome-shaped part 24, an outer annular part 25, and a rearwardly extending folded flange 38. In addition, however, it also includes an additional shell 43 which conceals the groove formed by the junction of the central dome-shaped part 24 and the outer annular part 25 and which is joined therewith by rolling the outer edge of the shell 43 with the curled underturned edge 37 of the outer annular part 25 as at 44. The use of the ornamental shell 43 with the wheel disk as shown in Figures 5 and 6 increases the stiffness of the structure and permits the use of thinner material throughout. It also enhances the general ornamental appearance of the wheel disk.

In the foregoing description of my invention it will be observed that I have pointed out wherein the axially rearwardly extending folded flange of the wheel disk is slightly distorted from its normally circular position when the wheel disk is disposed in mounted position on the vehicle wheel. While the embodiments of the present invention illustrated in Figures 5 to 7 of the drawings provide for the folded flange to pass radially inwardly past the shoulder on the wheel as compared with the embodiment of the invention illustrated in Figures 1 to 4 of the drawings, wherein the folded flange passes radially outwardly of the shoulder as the wheel disk is moved into position, it will of course be appreciated by those skilled in the art that the same novel principle of invention is involved. While the type and nature of the distortion of the folded flange when the wheel disk is in mounted position on the wheel may be referred to and described in varying manners, I have preferred to describe this distortion as being of a cloverleaf-like form. This, of course, is by virtue of the fact that certain portions of the normally circular flange are distorted to one side of its original circular position while other portions of the flange are distorted to the opposite side of the normally circular position.

While I have shown particular embodiments of my invention, it will, of course, be understood that I do not wish to be limited thereto, since many modifications may be made, and I, therefore, contemplate by the appended claims to cover all such modifications as fall within the true spirit and scope of my invention.

I claim as my invention:

1. A wheel disk having an axially rearwardly extending annular tightly folded portion formed therein, annularly spaced portions of said folded portion being depressed radially inwardly to form integral resilient wheel attaching means by which said disk may be directly secured to a vehicle wheel.

2. A wheel disk having an axially rearwardly extending annular tightly folded portion formed therein, annularly spaced portions of said folded portion being depressed radially outwardly to form integral resilient wheel attaching means by which said disk may be directly secured to a vehicle wheel.

3. In a wheel and wheel disk assembly including a wheel having a body part with an annular S-shape fold therein, said fold forming a generally radially outwardly extending shoulder and providing an annular groove therebehind, a wheel disk for disposition over the outer face of said wheel having an integral axially rearwardly extending folded flange thereon, spaced portions of said flange being depressed radially inwardly, said depressed portions resiliently engaging said shoulder within said annular groove, and the remaining portion of said flange being distorted from its normal circular position into a bulged configuration.

4. In a wheel and wheel disk assembly including a wheel having a body part with an annular S-shape fold therein, said fold forming a generally radially inwardly extending shoulder and providing an annular groove therebehind, a wheel disk for disposition over the outer face of said wheel having an integral axially rearwardly extending folded flange thereon, the diameter of said flange being less than the minimum clearance diameter of said shoulder, spaced portions of said flange being depressed radially outwardly, said depressed portions having a clearance diameter greater than the inside clearance diameter of said shoulder, said depressed portions resiliently engaging said shoulder within said annular groove, and the remaining portion of said flange being distorted from its normal circular position into a bulged configuration.

5. In a wheel and wheel disk assembly, including a wheel having a generally radially extending ridge-like portion on its outer face, a wheel disk for disposition over the outer face of said wheel having an axially rearwardly extending annular fold formed therein, annularly spaced portions of said fold being depressed in a radial direction, said depressed portions engaging said wheel behind said ridge-like portion, said annular fold in its mounted position on said wheel being distorted from its circular shape into a shape having a plurality of radial bulges.

6. In a wheel and wheel disk assembly including a wheel having a body part with a generally radially inwardly extending portion thereon and which provides an annular groove therebehind, a wheel disk for disposition over the outer face of said wheel having an integral axially rearwardly extending folded flange thereon, a dome-shaped central portion, an annular outer portion, an ornamental shell secured over said central dome-shaped portion and said annular outer portion, whereby the stiffness of said wheel disk is augmented, spaced portions of said flange being depressed radially outwardly, said depressed portions resiliently engaging said raised portion of said wheel within said annular groove, and the remaining portion of said flange being distorted from its normal circular position.

GEORGE ALBERT LYON.